United States Patent [19]
Evans

[11] 3,717,857
[45] Feb. 20, 1973

[54] ATHLETIC SWING MEASUREMENT SYSTEM

[75] Inventor: James W. Evans, Largo, Fla.

[73] Assignee: Athletic Swing Measurement, Inc., Clearwater, Fla.

[22] Filed: Nov. 27, 1970

[21] Appl. No.: 93,200

[52] U.S. Cl.............340/177 R, 340/182, 340/203, 340/279, 340/323, 325/118, 273/183 B, 128/2.1 A
[51] Int. Cl. ............................................G08c 15/00
[58] Field of Search..340/177 R, 182, 183, 188, 203, 340/207 R, 209, 279, 323; 325/111, 113, 118; 73/432 R, 379 G, 380 A, 381 G; 273/186 R, 183 R, 183 B; 128/2.1 A

[56] References Cited

UNITED STATES PATENTS

| | | | |
|---|---|---|---|
| 3,270,564 | 9/1966 | Evans | 73/432 R |
| 3,210,747 | 10/1965 | Clynes | 340/183 |
| 3,572,316 | 3/1971 | Vogelman et al | 128/2.1 A |
| 3,350,944 | 11/1967 | De-Michele | 340/177 R |

Primary Examiner—Donald J. Yusko
Assistant Examiner—Robert J. Mooney
Attorney—Duckworth and Hobby

[57] ABSTRACT

An athletic swing measurement method and apparatus for measuring characteristics of the swing of an athlete's arm, bat or club. An accelerometer is provided for measuring acceleration or velocity and strain gages for measuring flex and twist of a plate placed on an athlete's arm or within a bat or club, such as a golf club. Electrical signals analagous to the measurements of each gage are transmitted by a single transmitter to a receiver where they are converted for display, storage and comparison.

12 Claims, 4 Drawing Figures

James W. Evans
INVENTOR

By Duckworth & Hobby
Attorney

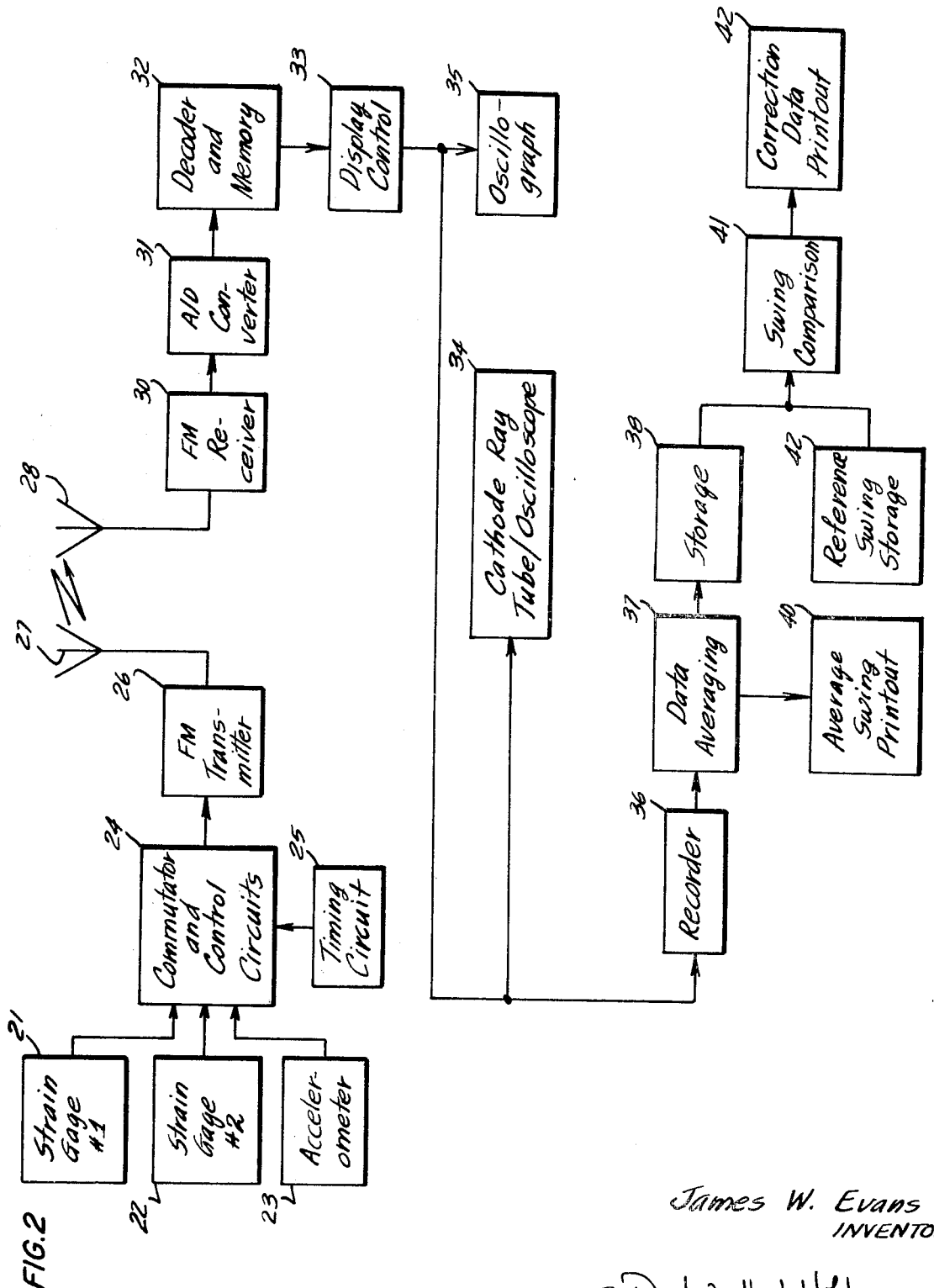

ATHLETIC SWING MEASUREMENT SYSTEM

BACKGROUND OF THE INVENTION

In athletic games wherein a bat or club is used to strike an object such as a ball or where a ball is thrown, such as a bowling ball, it is axiomatic that the degree of success is largely dependent upon the swing or stroke employed. This is especially the case with sports, such as golf, and much has been written descriptive of what a perfect golf swing should comprise. The difficulty in the past has been that of comparing the actual swing in a given case with a perfect swing. This difficulty in turn arises from the difficulty of observation of a golf swing due to the inability of the eye to catch any precise moment of a golf club during the stroke. This difficulty is well recognized and in efforts to overcome it, a number of techniques and devices have been devised to electrically and mechanically measure relevant parameters. Examples of these are illustrated as follows: the Fox U.S. Pat. No. 1,876,657 describes means involving a yieldable club face for indicating the degree of impact with a ball; the Walker U.S. Pat. No. 2,630,012; Lathrop U.S. Pat. No. 3,088,321 and Kirkman U.S. Pat. No. 3,106,403 show various means of indicating golf club velocities; the Chedister U.S. Pat. No. 3,037,777 is directed to means for determining the direction of a stroke; and the Alvarez U.S. Pat. No. 2,852,569, which describes means for assisting a golfer in determining both the direction and velocity of a swing. Recently it is understood that high speed motion picture photography has been employed in an effort to more precisely capture details of gold swings. One recent U.S. Pat. by Varju No. 3,182,508 measures the intensity of impact of a golf club and records this by a line connection leading from the golf club to recording equipment and finally the present inventor, in a related patent entitled ATHLETIC SWING MEASUREMENT SYSTEM, U.S. Pat. No. 3,270,564 of Sept. 6, 1966, provides a means of measuring the acceleration, torsion and the flex of a bat or club and especially of a golf club and transmitting these signals on three transmitters for display and analyzing the stroke characteristics of an athlete.

The present invention is related to U.S. Pat. No. 3,270,564 and reference may be had thereto for a better understanding of this invention.

The prior art devices and techniques as described have in general provided useful means of gathering information of value but it is the experience of the applicant that too often the information as would have been thus obtained is fragmentary and difficult to analyze and not readily translatable into usable form. For example, as a teaching aid, measurements should be accomplished not only without distraction but instantly and when employed to perform the role of analysis for the purpose of choosing a proper club, measurement data must be extensive and must be thoroughly correlated. These are believed shortcomings of the prior art.

It is accordingly one object of the present invention to provide a novel improvement to the previous patent by the present inventor for measuring athletic swings in general and which is substantially more complete than previously employed and which provides means without distraction of obtaining quickly, precisely and conveniently data that may be readily analyzed to correct defects in one's swing and also provide a relatively complete basis for the selection of proper athletic equipment such as a golf club or bowling ball. In accordance with the present invention means are provided for making one or more of several measurements which have been found significant in analyzing an athlete's stroke characteristics. These measurements which are electrically obtained are then transmitted by radio to a remote console which includes means for registering them continuously throughout a stroke and correlating them directly with time. Thus the system provides a complete analysis of the particular measurements made at each instance of significance throughout the stroke. Means are also provided for displaying this data for immediate examination or subsequent analysis. These measurements include velocity or acceleration, either twist or torsion, and flex or bending of a handle of a bat or club or of a plate attached to the athelete's arm or leg throughout the stroke.

SUMMARY OF THE INVENTION

The present invention relates to an athletic swing measurement system having an accelerometer(s) for measuring velocity or acceleration, and strain gages for measuring flex or bending, and twist or torsion in an athletic club or bat or in a plate attached to an athlete's arm or leg. The accelerometer and strain gages produce electrical signals analagous to the measurements made which signals are transmitted over the air in a single multiplexed channel to a receiving means adapted for separating signals and has analog to digital converter system for converting the received signals to digitized data indicative of the output of the accelerometer and strain gages and provides for displaying the data of one or more of the signals on a cathode ray tube, oscillograph display or recording from the data for later comparative analysis. In one embodiment a plate may have the strain gages attached to it and be easily adaptable for strapping to the wrist of the athlete so that the flex and twist in the plate, which will follow the twist and flex in the bone of the athlete's forearm, will allow measurements to be taken by the strain gages. The velocity or acceleration is measured with an accelerometer attached to the same plate. The method in accordance with the present invention provides for measuring the twist, flex and velocity or acceleration of the athlete's arm during a swing or stroke and transmitting electrical signals generated by the strain gages and accelerometer, receiving and separating these signals, then displaying the signals generated visually for immediate analysis and comparing the display pattern with predetermined patterns.

BRIEF DESCRIPTION OF THE DRAWINGS

Other objects, features and advantages of this invention will be apparent from a study of the written description and the drawings in which:

FIG. 2 is an electrical block diagram illustrating the overall operation of the electronics in accordance with the present invention;

DESCRIPTION OF THE PREFERRED EMBODIMENT

Figure 1:
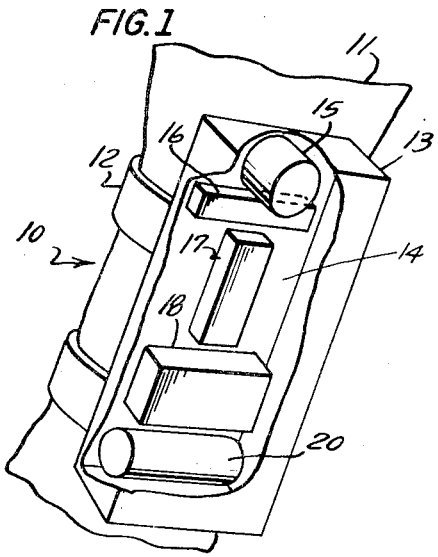
FIG. 1 is a perspective view with portions broken away of an athlete's limb attachment for use in accordance with one embodiment of the present invention.

Referring now to FIG. 1, a wrist pack unit 10 is illustrated attached to an athlete's arm 11 by straps 12. Wrist pack 10 has a casing 13 with a portion broken away to illustrate a bottom or mounting plate 14 which may be plastic or metal or any other material adapted to be flexed and twisted. Plate 14 is tightly attached to the arm 11 so that measurements may be taken relative to the plate which measurements will indicate twist and flex in the athlete's arm or bones in the arm. The velocity or acceleration of that portion of the arm can also be measured by measuring the velocity or acceleration of the plate attached to the arm. Inside the casing 13 is an accelerator module 15 attached to the plate along with strain gage 16 attached to the plate for taking measurements electrically, indicative of the twist in the plate 14 while the accelerometer 15 is measuring the acceleration or the velocity of the plate during the stroke of an athlete's arm 11. A second strain gage 17 is adapted to measure the flex or bending of the plate 14 and each of the gages 15, 16 and 17 are connected to the communications transmitter 18 for transmitting data over the air. Power pack 20 is also included for providing a power source for the gages and the transmitter and may consist of small batteries. The transmitter 18 may be frequency modulated (FM) or amplitude modulated (AM) as desired but because the unit must be small, it will typically be integrated or chip circuits commercially available and will need to transmit only a short distance such as 20 or 30 feet in the typical situation and will include a built-in antenna for transmitting the signals. While the present embodiment illustrates attachment to the athlete's wrist, it will of course be clear that each of the items in the wrist pack 10 could be placed in the club or bat of the athlete, as was described in more detail in my U.S. Pat. No. 3,270,564 for ATHLETIC SWING MEASUREMENT SYSTEM. However, the present embodiment allows my system to be utilized with sports such as bowling, where bats or clubs are not otherwise used and allows one wrist pack to be used for a greater combination of sports.

Referring now to FIG. 2, a block diagram has two gages and an accelerometer for generating measurements for transmission. Block 21 has strain gage No. 1, which measures the twist of the mounting plate as described in FIG. 1, while Block 22 has strain gage No. 2, which measures the flex or bend of the mounting plate of FIG. 1, and Block 23 is the accelerometer for measuring the acceleration and/or the velocity of the mounting plate of FIG. 1. The electrical signals generated by each of these gages is applied to a commutator and control circuit 24 which also receives a timing pulse from a timing circuit 25. Each timing pulse is followed by three data pulses, one from each of the gages 21, 22 and 23 in a 4 millisecond frequency. These four signals are repeated over and over in the same order and applied to a low frequency FM or pulse AM transmitter 26 for transmission over the air from the antenna 27. The transmitter needs to be able to transmit up to 25 feet but additional transmission ability may be useful in certain sports. Signals are transmitted to a receiving antenna 28 and applied to the AM or FM receiver 30. In the present system an FM receiver is illustrated since it is the system used by the present inventor but it of course should be clear that an AM system could be used without departing from the spirit and scope of the invention. The FM receiver 30 receives and amplifies the signals, transmits them to an analog to digital converter 31 which strips off the timing pulse and measures the amplitude of the analog value of the data pulses which are digitized and decoded in the decoder and memory circuit 32. Digitized signals are then applied to the display controls 33 which control the signals being applied to the cathode ray tube 34 which displays the selected signals on an X-Y grid of a cathode ray tube or oscilloscope. The signals may also be applied to the oscillograph 35 which places the same display on sheets for a permanent record. The display control 33 reads the memory every third data pulse so that they are reading continuous readings from one of three gages 21, 22 or 23 continuously and may select any one or more for simultaneous reading. The signals may also be applied simultaneously to a recorder 36 which may be an ordinary cassette type tape recorder for recording the data for later use at a service center where the cassettes may be applied to a data averaging circuit 37 where the data from a series of swings is averaged in a composite of several different readings for application to the storage circuit 38. Data averaging circuit is a simple addition circuit followed by a dividing circuit to give the composite swing coverage. This signal may then be applied to the average swing print-out 40 for printing an X-Y graph plot or print-out for use by the athlete who is being tested or it may be applied to a swing comparator 41 along with a reference swing storage of an ideal swing of one such as may be performed by top professionals in the sport which is stored in the reference swing storage circuit 42. The output from the comparison circuit 41 which simply plots one over the other to determine differences between the ideal swing and the athlete's swing provides a correction data print-out 42 showing differences between the athlete's composite swing and an ideal swing for determining how to improve the swing or how to select the best bowling ball, golf club, baseball bat, or the like, used by the particular athlete.

Figure 3:
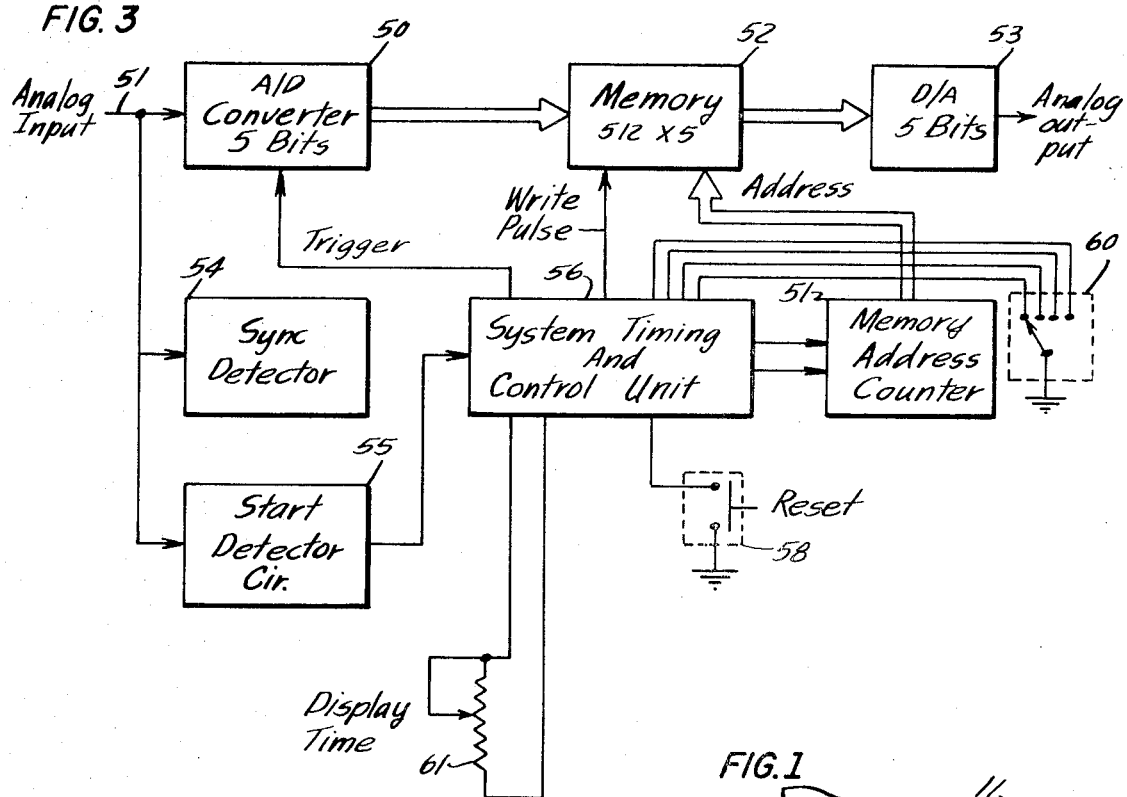
FIG. 3 is a block diagram of the analog to digital converter, decoder and memory and display control portion of the block diagram of FIG. 2.

Referring to FIG. 3, blocks 31, 32 and 33 of FIG. 2 are illustrated in more detail as having an analog to digital converter 50 from the analog input 51. The analog to digital converter signals are applied to the memory circuit 52 which is in turn applied to the digital to analog converter 53 which produces the analog output for display. The sync detector 54 strips the sync pulses off of the input analog data and the start detector circuit 55 indicates when the sync pulse is detected, and triggers the starting of sync detector for stripping the sync pulses off. Start detector circuit 55 also provides a loading memory to avoid false starts of the system which is applied to the system timing and control unit 56. This is part of the memory display systems which controls the pulses to provide lines rather than points thereby smoothing out the outputs on the display and triggers the memory circuit 57 to read. The reset switch sets the length of time the display will show while the memory address counter applies signals to the memory 52. Switching circuit 60 is connected to the system timing and control unit 56 and is switched to indicate what will be displayed on the display. For instance, the display can be switched by switching circuit 60 to indicate the twist of the plate, the flex of the plate or the velocity or acceleration or any combination of these signals. Thus the switch 60 is used to select which signal or combination of signals of the repetitive series of signals will be displayed on the display or selected from the memory 52 to drive the digital to analog converter to produce the analog output for the display. A variable resistor 61 varies the display time that any particular signal will be displayed on the cathode ray tube.

Figure 4:
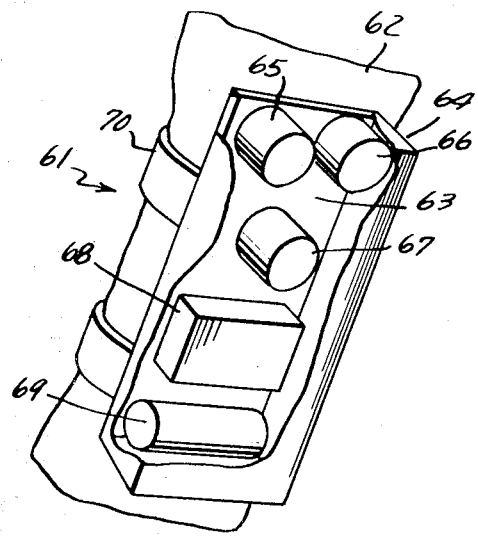
FIG. 4 is a perspective view with portion removed of a second embodiment of the limb attachment of FIG. 1.

Referring now to FIG. 4, a second embodiment is illustrated of the wrist pack of FIG. 1. This embodiment has an attachable measuring pack 61 attached to an athlete's arm 62 by straps 70. The wrist pack has a base member 63 in a casing 64. Attached to the base member 63 are three accelerometers 65, 66 and 67. Accelerometers 65 and 66 are attached to either side of the base member 63. Accelerometer 67 is attached to the center. Wrist pack 61 also has a transmitter 68 and battery pack 69 as previously described in the embodiment in accordance with FIG. 1 but varies from the previous embodiment in that there are three accelerometers and no strain gages. This provides an alternate method of making certain measurements of the wrist or leg or other portion of an athlete's body, or club or bat. The accelerometer 67 will measure the acceleration or the velocity similar to the accelerometer 15 of FIG. 1. However, instead of the strain gages, the accelerometers 65 and 66 determine the acceleration at two different points on the athlete's arm. These accelerations will vary because the arm is twisting or turning during a swing and will measure different accelerations. Each measurement is fed into a multiplexer similar to the embodiment of FIG. 2 and transmitted to a receiver, and the same electronics are used with the exception of the data from the accelerometer 65 and 66 are subtracted one from the other to give a difference which difference is displayed which is indicative of the twist in the arm, leg or other object that the wrist pack is attached to. It will of course be clear that more than three accelerometers could be used and averaged or compared as desired, without departing from the spirit and scope of the invention.

It should be clear at this point that a system has been provided for measuring athlete's swing in a great variety of sports. It will of course be clear that other measurements at different points can also be taken in accordance with the present invention by the utilization of proper measuring devices transmitting and displaying the signals in accordance with the present invention. This would also require different timing of the timing pulse and the number of data channels being transmitted and decoded, and while any type of strain gages may be employed, a simple battery energized variable resistance type properly oriented will provide variations in voltage with strain is ideally suited, which strain may be applied to the transmitter which may comprise simple voltage control oscillators utilized to produce frequency modulation. The accelerometer employed may be of the voltage generator type such as a Piezo-electric crystal or electro-magnetic device or may be of the variable resistor type, in each event producing by conventional means variable inputs in modulation to the FM transmitter. All of the electronics utilized in the production model of the present invention have been commercially available integrated circuits, but it will of course be clear that other types of circuitry can be utilized in accordance with the invention but because the electronics of the wrist pack unit 10 must be sufficiently small as to not interfere with the athlete it will of course require very small units such as may be found only in integrated or other microelectronics.

Accordingly, this invention is not to be construed as limited to the particular forms disclosed herein since these are to be regarded as illustrative rather than restrictive.

I claim:

1. An athletic measurement system comprising in combination:
    a. attaching member for removably attaching to a predetermined portion on an individual;
    b. measurement means including at least one accelerometer for measuring a plurality of conditions and converting said measurements into electrical signals, said measurement means being attached to said attaching member for measuring conditions of said attaching member;
    c. multiplexing means for multiplexing said electrical signals;
    d. transmitting means for transmitting said electrical signals over a single transmission path;
    e. receiving means for receiving signals from said transmitting means;
    f. analog to digital converter means for converting said received signals to digitized data indicative of said measurements; and
    g. output means for displaying the data from at least one said measurement means measured condition.

2. The apparatus according to claim 1 but including decoding and memory means following said analog to digital means for separating said multiplexed signals into continuous streams of data for each said measurement means measured condition.

3. The apparatus according to claim 2 in which said means includes a cathode ray tube.

4. The apparatus according to claim 2, in which said output means includes an oscillograph.

5. The apparatus according to claim 1 in which said measuring means includes a pair of strain gages adapted to measure twist and flex.

6. An apparatus for measuring an athletic swing comprising in combination:
    a. a plate adapted to be attached against the limb of an individual;
    b. attachment means for removably attaching said plate to said limb;
    c. measuring means for measuring changes in said plate during movement of said individual's limb; and
    d. transmitting means for transmitting said measurements of changes in said plate and receiving means for receiving and displaying said measurements.

7. The apparatus according to claim 6 in which said measuring means includes a strain gage to measure flex in said plate.

8. The apparatus according to claim 7 in which said measuring means includes a second strain gage to measure twist in said plate.

9. The apparatus according to claim 8 in which an accelerometer is attached to said plate for measuring acceleration of said plate.

10. The apparatus according to claim 9 but including a battery power supply for providing power to said transmitting means and to each said strain gage.

11. The apparatus according to claim 10 in which said transmitting means includes multiplexing means for multiplexing signals generated by said strain gages and said accelerometer for transmission over a single transmission path.

12. The apparatus in accordance with claim 6 in which said measuring means is a plurality of accelerometers each adapted to measure acceleration at different points on said plate.

* * * * *